US012645851B2

(12) United States Patent
Allen et al.

(10) Patent No.: US 12,645,851 B2
(45) Date of Patent: Jun. 2, 2026

(54) MODELLING METHOD AND SYSTEM

(71) Applicant: SIEMENS INDUSTRY SOFTWARE INC., Plano, TX (US)

(72) Inventors: George A. Allen, Okinawa (JP); Nilesh Joshi, West Chester, OH (US); Tod Parrella, Westwood, MA (US)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 888 days.

(21) Appl. No.: 15/757,013

(22) PCT Filed: Sep. 7, 2015

(86) PCT No.: PCT/CN2015/089075
§ 371 (c)(1),
(2) Date: Mar. 2, 2018

(87) PCT Pub. No.: WO2017/041213
PCT Pub. Date: Mar. 16, 2017

(65) Prior Publication Data
US 2018/0247004 A1 Aug. 30, 2018

(51) Int. Cl.
*G06F 30/23* (2020.01)
*B33Y 50/02* (2015.01)
(Continued)

(52) U.S. Cl.
CPC .............. *G06F 30/23* (2020.01); *B33Y 50/02* (2014.12); *G06F 30/00* (2020.01); *G06F 30/10* (2020.01);
(Continued)

(58) Field of Classification Search
CPC ........ G06F 30/367; G06F 30/00; G06F 30/17; G06F 2113/22; G06F 2119/18;
(Continued)

(56) References Cited

U.S. PATENT DOCUMENTS 5,487,021 A 1/1996 Fujita
6,489,957 B1 12/2002 Han et al.
(Continued)

FOREIGN PATENT DOCUMENTS

CN 102067130 A 5/2011
CN 103970905 A 8/2014
(Continued)

OTHER PUBLICATIONS

Tautges, "Geometry, Mesh Components for Scientific Computing", 15th International Meshing Roundtable Birmingham, AL Sep. 17, 2006, pp. 1-72 (Year: 2006).*
(Continued)

*Primary Examiner* — Michael Edward Cocchi
(74) *Attorney, Agent, or Firm* — Lempia Summerfield Katz LLC

(57) ABSTRACT

A method for geometric modelling method performed by a data processing system on a geometric model including a kernel and associated applications, the method includes receiving data for an object to be processed by the kernel, generating a standalone object for a user interface application of the geometric model, and storing the standalone object. A data processing system is configured for modelling a product according to the method.

14 Claims, 8 Drawing Sheets

(51) Int. Cl.

| | |
|---|---|
| *G06F 30/00* | (2020.01) |
| *G06F 30/10* | (2020.01) |
| *G06F 30/17* | (2020.01) |
| *G06F 119/18* | (2020.01) |
| *G06T 17/20* | (2006.01) |
| *G06F 113/22* | (2020.01) |

(52) U.S. Cl.
CPC ............ *G06F 30/17* (2020.01); *G06T 17/205* (2013.01); *G06F 2113/22* (2020.01); *G06F 2119/18* (2020.01)

(58) Field of Classification Search
CPC .......... G06F 30/23; G06F 30/10; G06F 30/12; G06T 17/205; G06T 19/00; B33Y 50/02
See application file for complete search history.

(56) References Cited

U.S. PATENT DOCUMENTS

| | | | |
|---|---|---|---|
| 7,589,720 | B2 | 9/2009 | Zhou et al. |
| 8,576,221 | B2 | 11/2013 | Lim et al. |
| 8,706,452 | B2 | 4/2014 | Miller |
| 8,731,876 | B2 | 5/2014 | Carr et al. |
| 8,928,661 | B2 | 1/2015 | Grenfell |
| 8,963,958 | B2 | 2/2015 | Berger et al. |
| 8,988,420 | B2 | 3/2015 | Huang et al. |
| 2004/0001061 | A1 | 1/2004 | Stollnitz |
| 2006/0235294 | A1 | 10/2006 | Florin et al. |
| 2007/0265727 | A1 | 11/2007 | Bae et al. |
| 2007/0285425 | A1 | 12/2007 | Bae et al. |
| 2008/0246761 | A1 | 10/2008 | Faken et al. |
| 2008/0259077 | A1 | 10/2008 | Liepa et al. |
| 2009/0259442 | A1* | 10/2009 | Gandikota .............. G06F 30/12 703/1 |
| 2010/0305906 | A1* | 12/2010 | Yu ........................... G06F 30/10 703/1 |
| 2013/0116983 | A1 | 5/2013 | Montana |
| 2014/0184598 | A1 | 7/2014 | Quilot et al. |
| 2015/0142152 | A1 | 5/2015 | Rezayat |
| 2015/0154796 | A1 | 6/2015 | Co |
| 2015/0178424 | A1* | 6/2015 | Harkness ................ G06F 30/23 703/1 |
| 2015/0193976 | A1 | 7/2015 | Crocker |
| 2015/0317413 | A1* | 11/2015 | Georgescu .............. G06F 30/00 703/1 |

FOREIGN PATENT DOCUMENTS

| | | |
|---|---|---|
| CN | 104182517 A | 12/2014 |
| EP | 0994429 A1 | 4/2000 |
| GB | 2389764 A | 12/2003 |
| JP | 2008090766 A | 4/2008 |
| JP | 2011526389 A | 10/2011 |
| JP | 2012119010 A | 6/2012 |
| JP | 2015146210 A | 8/2015 |
| RU | 2119188 C1 | 9/1998 |
| WO | 2017041214 A1 | 3/2017 |

OTHER PUBLICATIONS

Beall et al. "Accessing CAD Geometry for Mesh Generation", Proceedings of the 12th international meshing roundtable , Sandia National Laboratories (2003), pp. 1-10 (Year: 2003).*

Le' on, Jean-Claude, Rosalinda Ferrandes, and Franca Giannini. "Shape processing and reasoning for multiple product views: key issues and contributions to a general framework." Engineering Systems Design and Analysis. vol. 48371. 2008. (Year: 2008).*

Mannino, Michael. Computer-aided design optimization of airflow duct systems for cooling of electronic assemblies. Diss. The Cooper Union for the Advancement of Science and Art, 2001. (Year: 2001).*

Ebrahim, Mostafa Abdel-Bary. "3D laser scanners' techniques overview." Int J Sci Res 4.10 (2015): 323-331. (Year: 2015).*

Zhang, Yingzhong, et al. "Remanufacturing-oriented geometric modelling for the damaged region of components." Procedia Cirp 29 (2015): 798-803. (Year: 2015).*

Besl, P. "Hybrid modeling for manufacturing using NURBS, polygons, and 3D scanner data." 1998 IEEE International Symposium on Circuits and Systems (ISCAS). vol. 5. IEEE, 1998. (Year: 1998).*

International Search Report dated Jun. 12, 2016, for PCT/CN2015/089075.

Ferrari, Giacomo, et al. "An extended 8-Rep solid modeling kernel integrating mesh and NUR8S faces." Computer-Aided Design and Applications 15.5 (2018): 697-706. (Year: 2018).

Freytag, Michael, and Vadim Shapiro. "8-rep SE: simplicially enhanced boundary representation." Proceedings of the ninth ACM symposium on Solid modeling and applications. 2004. (Year: 2004).

Hamri, Okba, et al. "Software environment for CAD/CAE integration." Advances in Engineering Software 41.10-11 (2010): 1211-1222. (Year: 2010).

Havemann, Sven, and Dieter W. Fellner. "Progressive combined 8-reps-multi-resolution meshes for interactive real-time shape design." (2008). (Year: 2008).

Nguyen, Cong Hong Phong, and Young Choi. "Triangular mesh and boundary representation combined approach for 3D CAD lightweight representation for collaborative product development." Journal of Computing and Information Science in Engineering 19.1 (2019). (Year: 2019).

Pan, Zhiyi, et al. "Computer-aided design-while-engineering technology in top-down modeling of mechanical product." Computers in industry 75 (2016): 151-161. (Year: 2016).

Wang, Lidong. "The integrated CAD/CAE system based on the common standard in information exchange and the common model in geometric representation." International Journal of Computational Systems Engineering 1.3 (2013): 211-216. (Year: 2013).

Xia, Zhaohui, et al. "A CAD/CAE incorporate software framework using a unified representation architecture." Advances in Engineering Software 87 (2015): 68-85. (Year: 2015).

Arisoy, Erhan Batuhan, et al. "Design and topology optimization of lattice structures using deformable implicit surfaces for additive manufacturing." International Design Engineering Technical Conferences and Computers and Information In Engineering Conference. vol. 57113. (Year: 2015).

Ou, Li-Ming, and Xun Xu. "Relationship matrix based automatic assembly sequence generation from a CAD model." Computer-Aided Design 45.7 (2013): 1053-1067. (Year: 2013).

Alberts Matthias et al: "Designing Solid Composites", Ansys Advantage, vol. VII, No. 1, pp. 51-53, XP055579844, the entire document, in particular fig. 2, 3a-b, 4; 2013.

Wypysinski Rafal: "Hybrid modeling in CAD", Advanced Technologies in Mechanics, vol. 2, No. 1(2), Jul. 2015, pp. 15-22, XP055581117, DOI: 10.17814/atim.2015.1(2). 14, the entire document, in particular section 3 (p. 19-21), fig. 4, 8; 2015.

Kia, Zhaohui, et al. "A CAD/CAE incorporate software framework using a unified representation architecture." Advances in Engineering Software 87 (2015): 68-85. (Year: 2015).

Wang, L. "Integration of CAD and boundary element analysis through subdivision methods." Computers & Industrial Engineering 57.3 (2009): 691-698. (Year: 2009).

Lai, Lip M., and Matthew MF Yuen. "Blending of mesh objects to parametric surface." Computers & Graphics 46 (2015): 283-293. (Year: 2015).

Owen, Steven J., David R. White, and Timothy J. Tautges. "Facet-Based Surfaces for 3D Mesh Generation." IMR. 2002. (Year: 2002).

Varady, Tamas. "Automatic procedures to create CAD models from measured data." Computer-Aided Design and Applications 5.5 ( 2008): 577-588. (Year: 2008).

Zhang, Yingzhong, et al. "Remanufacturing-oriented geometric modelling for the damaged region of components." Procedia CIRP 29 (2015): 798-803. Available online May 21, 2015. (Year: 2015).

Siemens, "Parasolid: The world's leading production-proven 3D modeling kernel", copyright 2011. Accessed via the Siemens website (Year: 2011).

(56)          References Cited

OTHER PUBLICATIONS

Liebling, Thornas M., and Lionel Pournin. "Voronoi diagrams and Delaunay triangulations: Ubiquitous siamese twins." Documenta Mathematics, ISMP (2012): 419-431. (Year: 2012).

Besl, P. "Hybrid modeling for manufacturing using N U RBS, polygons, and 3D scanner data." ISCAS'98. Proceedings of the 1998 IEEE International Symposium on Circuits and Systems (Cat. No. 98CH36187). vol. 5. IEEE, 1998. (Year: 1998).

Hamri, Okba, et al. "Interfacing product views through a mixed shape representation. Part 1: Data structures and operators." International Journal on Interactive Design and Manufacturing (IJ IDeM) 2.2 (2008): 69-85. (Year: 2008).

Sheffer, Alia, et al. "Mesh parameterization: Theory and practice." ACM SIGGRAPPH, course notes 10.1281500.1281510 (2007). (Year: 2007).

Botsch, Mario, et al. "Geometric modeling based on polygonal meshes video files associated with this course are available from the citation page." ACM SIGGRAPH 2007 courses. 2007. 1-es. (Year: 2007).

Pemot, J-P., et al. "A hybrid models deformation tool for free-form shapes manipulation." International Design Engineering Technical Conferences and Computers and Information in Engineering Conference. vol. 43253. 2008. (Year: 2008).

Lindstrom Peter, et al. "Real-time, continuous level of detail rendering of height fields"; Proceedings of the 23rd annual conference on Computer graphics and interactive techniques; 1996.

Cignoni, Paolo, et al. "A general method for preserving attribute values on simplified meshes"; Proceedings Visualization '98, (Cat. No. 98CB36276), IEEE 1998.

Balmelli, Laurent, Jelena Kovacevic, and Martin Vetterli. "Quadtrees for embedded surface visualization: Constraints and efficient data structures"; Proceedings 1999 International Conference on Image Processing, (Cat. 99CH36348), vol. 2, IEEE 1999.

GVS, Prabhakar Reddy, et al. "Quadtree-Based Triangular Mesh Generation for Finite Element Analysis of Heterogeneous Spatial Data"; The 2001 ASAE Annual International Meeting (Paper ID: 01-3072), Sacramento, CA; 2001.

Ray, Nicolas, et al. "Periodic global parameterization"; ACM Transactions on Graphics, (TOG), 25.4 (2006); 1460-1485.

Wuhrer, Stefanie, R. Atanossov, and Chang Shu. "Fully automatic texture mapping for image-based modeling"; Canada: Council, 2006, [Jul. 3, 2010]; http://J cg. scs. carleton, ca/-swuhrer/publications/ nrc_texture_report, pdf (2006).

Fu, You, Fan Zhou, and Ruomei Wang. "An Improved Texture Mapping Model Based on Mesh Parameterization in 3D Garments"; 2014 5th International Conference on Digital Home, IEEE 2014; 2014.

Scratchapixel, "Ray Tracing: Rendering a Triangle", accessed via WayBack Machine with an archive date of May 2015, URL: www(dot)scratchapixel (dot)com/lessons/3d-basic-rendering/ray-tracing-rendering-a-triangle/barycentric-coordinates; 2015.

Abasolo, M.J., De Giusti, A., and Blat, J. "A hierarchical triangulation for multiresolution terrain models." Journal of Computer Science & Technology 1 (2000). (Year: 2000).

Parwana, S., "Surface Triangulation and the Downstream Effects on Surface Flattening", PhD Dissertation, University of Birmingham, Dec. 2010 (Year: 2010).

Eck, Hobart and William Smith Colleges, Math 204: Linear Algebra, Fall 2020, Reading Guides for Math 204, Chapter 16: "Affine Transformations", accessed via URL: math(dot)hws(dot)edu/eck/ math204/guide2020/16-affine-maps(dot) html (Year: 2020).

Biermann, Henning, et al. "Cut-and-paste editing of multiresolution surfaces." ACM transactions on graphics (TOG) 21.3 (2002): 312-321. §§ 1-2 (Year: 2002).

Matt, "Capabilities of the SolidWorks Shell Command", Jan. 2012, URL: dezignstuff(dot)com/capabilities-of-the-solidworks-shel I-command/ (Year: 2012).

Qian, Guiping, and Y. U. E. Wang. "Mesh Geometric Editing Approach Based on GPU Texture." International Journal of Computer Science Issues (IJCSI) 9.5 (2012): 67. § 1 (Year: 2012).

Siemens, "World-class finite element analysis (FEA) solution for the Windows desktop", copyright 2008, URL: www(dot)plm(dot) automation(dot)siemens(dot)com/en_gb/Images/fe%20finite% 20element%20analysis%20for%20windows%20fs%20W%205_ tcm642-53789(dot)pdf (Year: 2008).

Qing Hui Wang et al.: "Live parametric design modifications in CAD-linked virtual environment", The International Journal of Advanced Manufacturing Technology, Springer, Berlin, De, vol. 50, No. 9-12, pp. 859-869, XP019837743, Issn: 1433-3015; Abstract; Sections 3.2, 4; Figure 5; the whole document; 2010.

Junjie Xue et al.: "Interactive Rendering and Modification of Massive Aircraft CAD Models in Immersive Environment", Computer-Aided Design and Applications, vol. 12, No. 4, pp. 393-402, XP055469318, US Ssn: 1686-4360, DOI:10.1080/16864360.2014. 997635; Abstract; Sections 3.1, 4, 4.1, 4.2, 4.2.1, 4.2.2; Figure 5; the whole document; 2015.

* cited by examiner

FIG 1
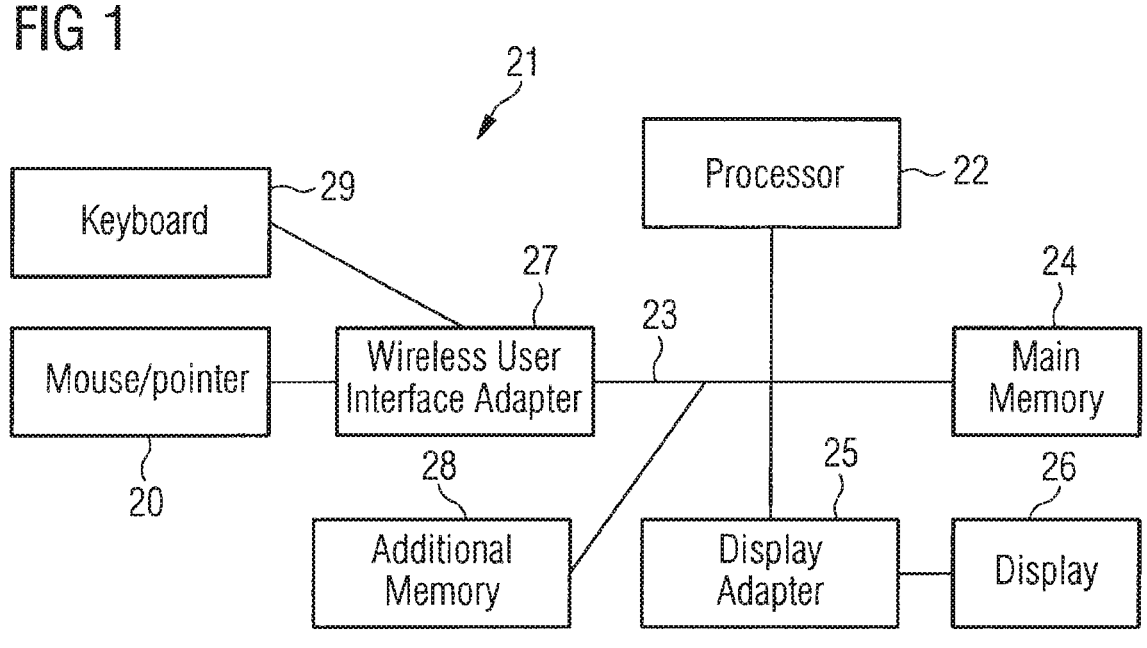
FIG 2a
FIG 2b
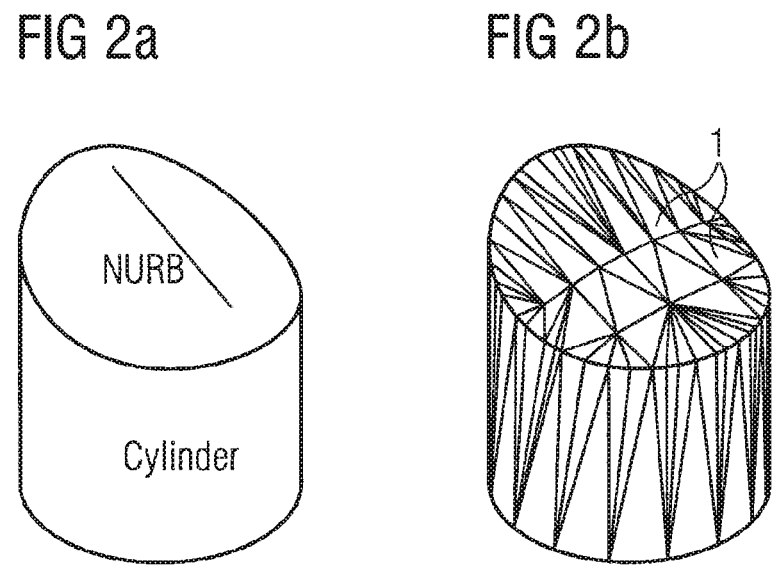

FIG 10
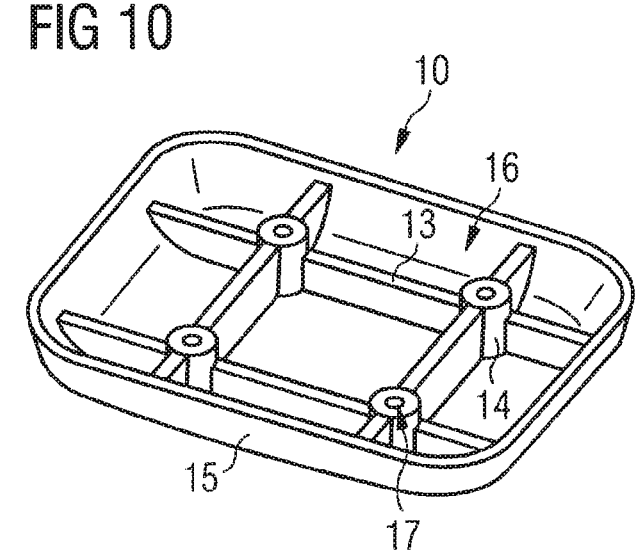
FIG 11c    FIG 11d
FIG 11b
FIG 11a
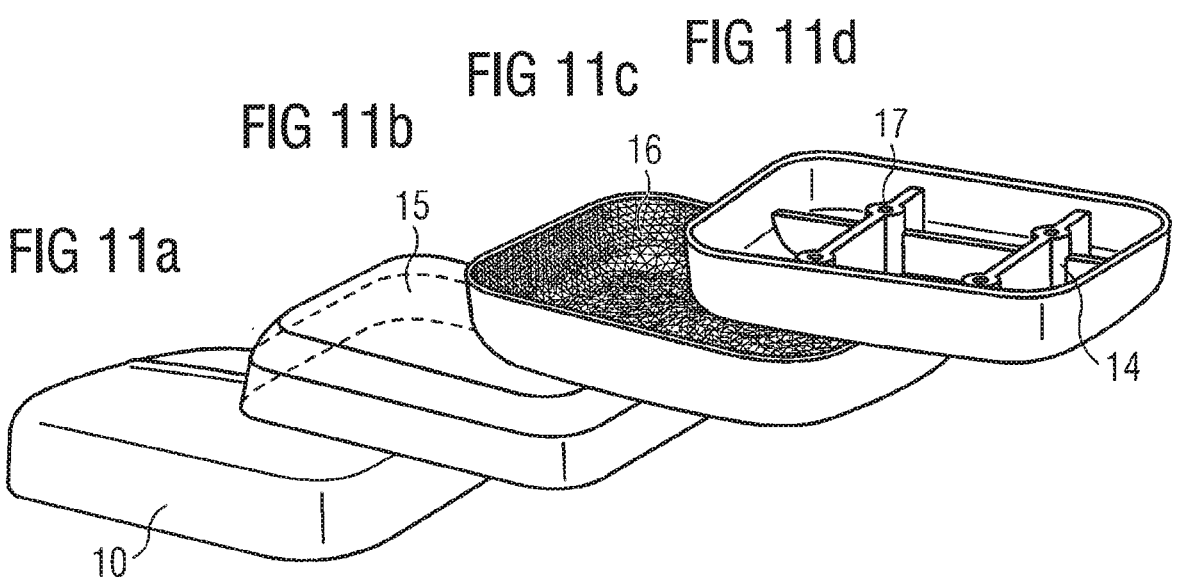

MODELLING METHOD AND SYSTEM

CROSS REFERENCE TO RELATED APPLICATIONS

This application is the US National Stage of International Application No. PCT/CN2015/089075 filed Sep. 7, 2015, claims the benefit thereof, and is incorporated by reference herein in its entirety.

TECHNICAL FIELD

This present disclosure relates to the general field of computer aided technologies ("CAX") including computer aided design, drafting ("CAD"), engineering ("CAE") manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for geometric modelling performed by a data processing system on a geometric model comprising a kernel and associated applications, as well as a method and a data processing system for modelling a product.

In accordance with a first aspect a geometric modelling method performed by a data processing system on a geometric model comprising a kernel and associated applications comprises receiving data for an object to be processed by the kernel; generating a standalone object for a user interface application of the geometric model and storing the standalone object.

The method may further comprise detecting changes to the object to be processed by the kernel; propagating those changes to the stored standalone object to update the standalone object; and storing the updated standalone object. The object to be processed by the kernel may comprise one of a mesh or a polyline.

The method may further comprise receiving an input in a function of the data processing system via the user interface; and, receiving instructions choosing an output format for the function; wherein the output format comprises one of a facetted output or a classic geometry boundary representation output; processing the input in the function; applying the chosen output format to the processed input; and, outputting the processed input in the chosen output format.

The method may further comprise importing legacy mesh file data into the data processing system; creating a facetted mesh file from the imported data and storing the facetted mesh file for further processing.

In accordance with a second aspect, a method of modelling a product comprises deriving mesh data relating to one or more regions of the product and designating the one or more regions as mesh regions, wherein the mesh data comprises a connected collection of facets; deriving a classic geometric representation of one or more regions of the product and designating the one or more regions as classic geometry regions, wherein the classic geometry representation comprises curved surfaces; wherein the mesh data and classic geometry data are distinct from one another; in the data processing system, receiving instructions of a selection of at least one mesh region of the product; in the data processing system, receiving instructions of a selection of at least one classic geometry region of the product; establishing a relationship between the mesh region and the classic geometry region; developing structural body parts or tooling for manufacture based on the established relationship; supplying updated data for one of the mesh regions or classic geometry regions; propagating changes in the data, regardless of data format, based on the derived relationship; and, providing updated structural body parts or tooling for the modelled product.

Different regions of a product may be modelled in different data processing formats and a relationship of the different regions of the product is established, so that updates to one data object may be propagated to another region, regardless of the data format.

The method may further comprise deriving a relationship between an inner surface of the mesh region and an outer surface of the classic geometry region. Mesh data representing an outer surface or appearance can be propagated throughout the structural parts and associated tooling, represented by classic geometry, without any need for format conversion, or delaying the design process until the external appearance has been fixed. The changes in the data for one of the mesh regions or the classic geometry regions may be propagated to another region, regardless of the data format.

The mesh data may be derived from a physical sample of the part or parts. The mesh data may be derived by scanning the physical sample. The method may further comprise storing the mesh data in a store as a collection of facets.

The classic geometry representation may be derived by simulation in the data processing system. The method may further comprise storing the representation of the modelled product. The method may further comprise generating manufacturing instructions for the body parts or tooling. The manufacturing instructions may comprise instructions for additive manufacturing.

In accordance with a third aspect, a data processing system having at least a processor and accessible memory, the data processing system being configured to model a product, may carry out the steps of deriving mesh data relating to one or more regions of the product and designating the one or more regions as mesh regions, wherein the mesh data comprises a connected collection of facets; deriving a classic geometric representation of one or more regions of the product and designating the one or more regions as classic geometry regions wherein the classic geometry representation comprises curved surfaces; wherein the mesh regions and classic geometry regions are distinct from one another; in the data processing system, receiving instructions of a selection of at least one mesh region of the product; in the data processing system, receiving instructions of a selection of at least one classic geometry region of the product; establishing a relationship between the mesh region and the classic geometry region; developing structural body parts or tooling for manufacture based on the established relationship; supplying updated data for the one of the mesh regions, or classic geometry regions; propagating changes to the data, regardless of data format, based on the derived relationship; and, providing updated structural body parts or tooling for the modelled product.

The system wherein the established relationship is between an inner surface of the mesh region and an outer surface of the classic geometry region. The system may further comprise a display configured to output the representation of the modelled region. The system may further comprise a store to store the representation of the modelled region. The system may further comprise a scanner to scan a physical sample of the part or parts and thereby derive the mesh data.

In accordance with a fourth aspect a non-transitory computer-readable medium encoded with executable instructions that, when executed, cause one or more data processing systems to perform a method of modelling a product comprising deriving mesh data relating to one or more regions of the product and designating the one or more regions as mesh regions, wherein the mesh data comprises a connected collection of facets; deriving a geometric representation of one or more regions of the product and designating the one or more regions as classic geometry regions, wherein the classic geometric representation comprises curved surfaces; wherein the mesh regions and classic geometry regions are distinct from one another; in the data processing system, receiving instructions of a selection of at least one mesh region of the product; in the data processing system, receiving instructions of a selection of at least one classic geometry region of the product; establishing a relationship between the mesh region and the classic geometry region; developing structural body parts or tooling for manufacture based on the established relationship; supplying updated data for one of the mesh regions, or classic geometry regions; propagating changes in the data, regardless of data format, based on the derived relationship; and, providing updated structural body parts or tooling for the modelled product.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and data processing system according to the present disclosure will now be described with reference to the accompanying drawings in which:

FIG. 1 is a block diagram of a data processing system in which an embodiment can be implemented;

FIGS. 2a and 2b illustrate structural forms to which a method of this disclosure may be applied;

FIG. 10 illustrates a finished part in accordance with the disclosed embodiments;

FIGS. 11a to 11d illustrate the process steps in an exemplary method for producing a part in accordance with the disclosed embodiments;

FIG. 12 is a flow diagram of a conventional process;

FIG. 13 is a flow diagram of a process in accordance with disclosed embodiments.

DETAILED DESCRIPTION

Figure 3:
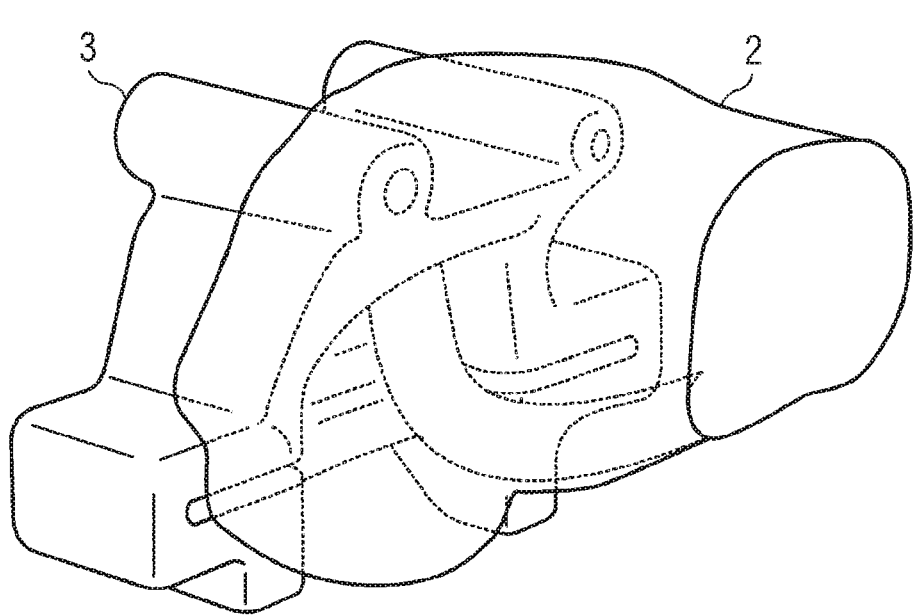
FIG. 3 illustrates one example of cooperating parts which may be designed according to the method of this disclosure.

The embodiments of FIGS. 1 to 13 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

FIG. 1 illustrates an example of a data processing system in which an embodiment of the present disclosure may be implemented, for example a CAD system configured to perform processes as described herein. The data processing system 21 comprises a processor 22 connected to a local system bus 23. The local system bus connects the processor to a main memory 24 and graphics display adaptor 25, which may be connected to a display 26. The data processing system may communicate with other systems via a wireless user interface adapter connected to the local system bus 23, or via a wired network, e.g. to a local area network. Additional memory 28 may also be connected via the local system bus. A suitable adaptor, such as wireless user interface adapter 27, for other peripheral devices, such as a keyboard 29 and mouse 20, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system.

An operating system included in the data processing system enables an output from the system to be displayed to the user on display 26 and the user to interact with the system. Examples of operating systems that may be used in a data processing system may include Microsoft Windows™, Linux™, UNIX™, iOS™, and Android™ operating systems.

In addition, it should be appreciated that data processing system 21 may be implemented as in a networked environment, distributed system environment, virtual machines in a virtual machine architecture, and/or cloud environment. For example, the processor 22 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 21 may vary for particular implementations. For example the data processing system 21 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 21 may be connected to the network (not a part of data processing system 21), which can be any public or private data processing system network or combination of networks, as known to those of skill in the art, including the Internet. Data processing system 21 can communicate over the network with one or more other data processing systems such as a server (also not part of the data processing system 21). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Traditional CAD models are composed of faces, which are sewn together along shared edges. A face is just a region of a larger surface, on which it lies. Many types of surfaces are used. The most common ones are quadric surfaces, for example cylinders and cones, and the most complex are free-form non-uniform rational basis spline (NURBS) surfaces. Most of these surfaces are curved in space, so are sometimes referred to as curved surface or curvy models, for example as shown in FIG. 2a. Another common type of model is one composed entirely of small planar faces that simulate curved ones. The model looks like a gem-stone, with many small planar faces, referred to as facets 1, combining to give a curved appearance, for example as shown in FIG. 2b. Models constructed this way are called "faceted" or "polygonal" models.

Figure 4:
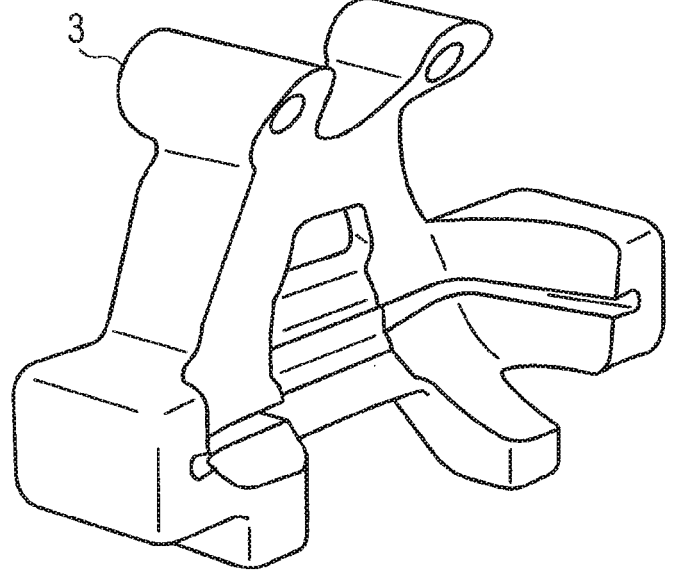
FIG. 4 shows one of the parts of FIG. 3 separately.

Faceted models are becoming increasingly common. They arise from many different sources, often as a result of some sort of scanning process. As the quality of scanners is improving rapidly, and prices are dropping, so scanning is becoming a much more common practice, for example a faceted model may be obtained from a scan of a design originally made as a physical model in wood, or clay, or wax. This is common because "soft" features of a design, such as the feel of the product to the user, for example the feel of a handle of a tool, or the casing of a mobile phone, or computer mouse, cannot be perceived by the user from a simulation. Additionally, toys or jewellery may be designed by a craftsman, then need to be mass produced by machine. Another source of scans is when scans are made to reverse engineer products, for example to create replacement components to maintain equipment which has outlived the original company that made the component, or where the original engineering drawings have been lost, or where the design is modified in its physical form during testing, for example stamping dies. In future, scanned data may also be used for generation of replacement parts for surgery, such as teeth or bones, which must fit in place and it is desirable to be able to process this data along with classic geometric models for making the associated jigs 3, for example for fitting knee replacements 2 as illustrated in FIGS. 3 and 4. Another future application is in custom fit designs, for example using data from body scanners, for products such as shoe orthotics, or hearing aids, diving masks, or prosthetic limbs.

Conventionally, scanned data in faceted models had to be manipulated by facet specific software, then exported in a non-history based, non parametric format. Even where the scanned data had been imported into a CAD system, such as NX software available from Siemens Product Lifecycle Management Software Inc (Plano, TX), as a faceted model, the faceted model was not an integral part of the workflows for part modelling. This is because, if a faceted model was to be used, then a "surfacing" step was required in which point clouds or faceted objects are converted into traditional CAD models with curved surfaces. Rebuilding the faceted model using curved surfaces, for example using a boundary representation model, or analytic geometry, is time consuming and labour-intensive. A temporary analytic geometry may have been created, or else it would have been necessary to wait for the surface models to become available before the surface model could be used within applications such as part modelling. Furthermore, this surfacing step is on the critical path of many typical industry workflows. This means that downstream activities, such as the design of mating parts and tooling, or studies of interior packaging, cannot begin until the "surfacing" step is complete.

Figure 5:
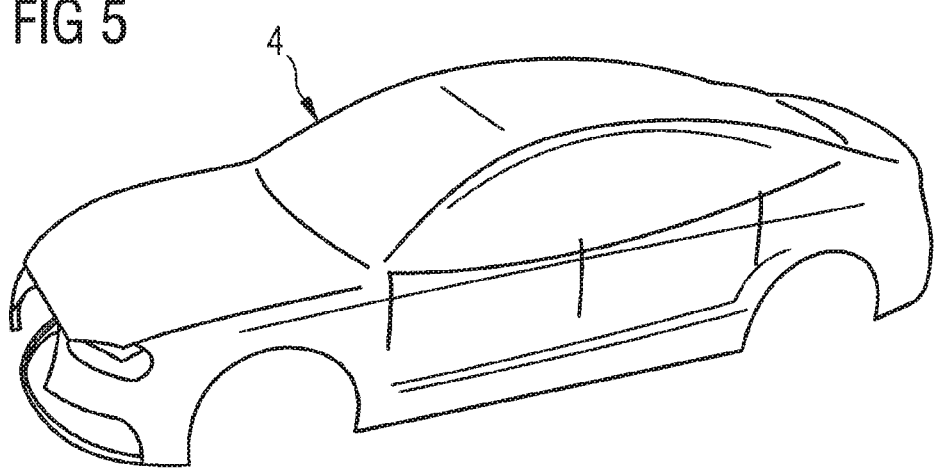
FIG. 5 illustrates a part of a product which may be designed according to the method of this disclosure.
Figure 6:
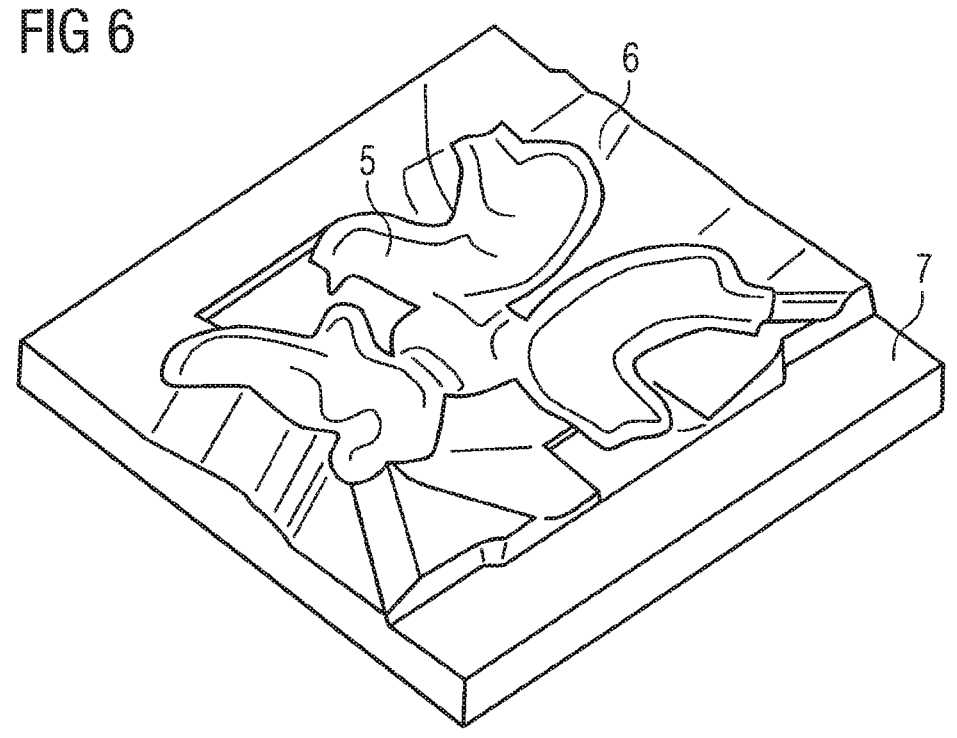
FIG. 6 illustrates an example of parts designed in different formats.

The problem is especially severe in situations such as automotive styling 4, as illustrated in FIG. 5, where new versions of the faceted model are released periodically, forcing the surfacing step to be re-done, or for manufacturing medical implants, where it is simply not possible in conventional part modelling to make a CAD model of existing bones. However, the bones can be scanning to create a faceted representation. As mentioned above the fitting, or supporting operations on the parts made from the scanned bones produce a better result if they can be modelled in the CAX system using an analytic model, or boundary representation model, rather than a facet based model. Another example where a hybrid boundary representation and facet based model is beneficial is in production of moulded products, such as shown in FIG. 6, where parts of the mould 5 are dependent on the faceted detail of the product 6 and other parts 7 must use an analytic model to ensure exact dimensions to interact with the equipment in which the mould is used. For the purpose of this description, the term facet is a triangular region of a plane and a mesh is a connected collection of facets; a classic geometric representation is a geometric representation based on curved surfaces.

Figures 7A, 7B, 7C, 7D, 7E:
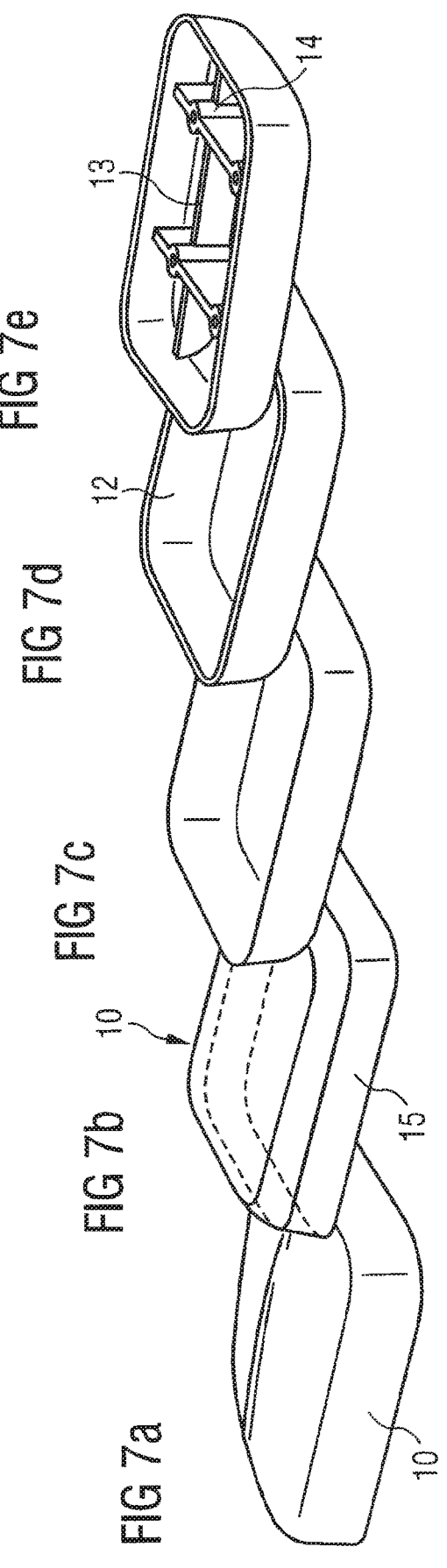
FIGS. 7a to 7e illustrate the steps involved in a conventional part modelling process.
Figure 8:
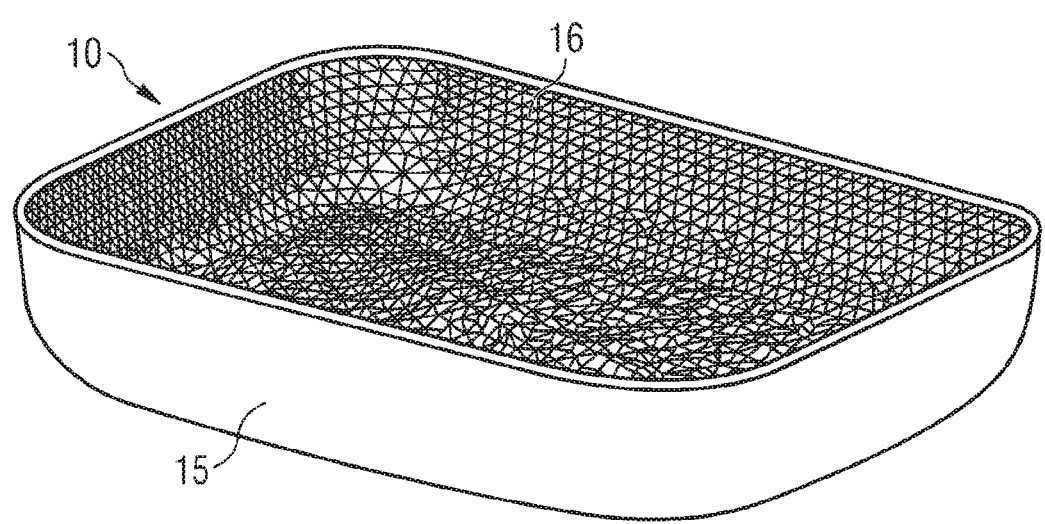
FIG. 8 illustrates a scanned part in accordance with the disclosed embodiments.
Figure 9:
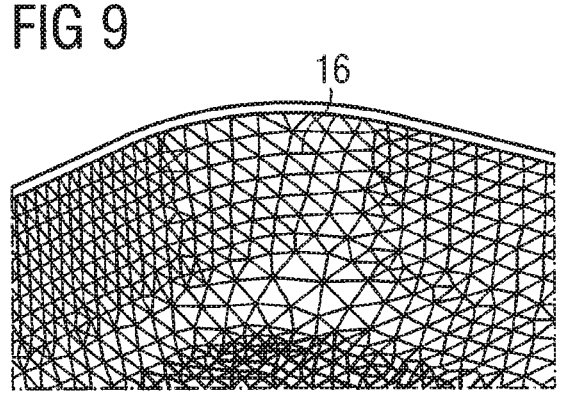
FIG. 9 illustrates the part of FIG. 8 in more detail in accordance with the disclosed embodiments.

The full conventional process is illustrated graphically in FIGS. 7*a* to 7*e*. The carved or moulded external shape 10 is provided as a physical embodiment made from a medium such as wood or clay, as shown in FIG. 7*a*. The physical product 10 is scanned, as shown in FIG. 7*b* and the scanned data is imported into a CAD system, where it is converted, i.e. surfaces are constructed which match the scan data, as shown in the image of FIG. 7*c*. An offset is applied to generate inner walls 12 as shown in FIG. 7*d* and structural details, such as ribs 13 and bosses 14, are added as shown in FIG. 7*e*. Thus, the exterior surface 15 of the shell 10 is naturally represented by facets, but for all later stages of the processing, those facets have been converted to surfaces, or classic geometry, for further processing. Using a conventional CAD model, the workflow described above requires conversion of the outer shape to a curved-surface model before proceeding, because current modelling operations, such as offsetting and Booleans, do not work on a mixture of facets and classic surfaces. Converting faceted models to curvy ones, i.e. converting to surfaces, slows down the development of products and tooling, which can be frustrating for users and costly to the business.

Improvements to the user interface software have been desired which would speed up the process of converting the scan data to curved surface model. Some systems have special "rapid surfacing" functions that aim to make it easy to convert faceted models to curvy ones. However, even with the best software, the conversion still takes time and effort. Highly convoluted shapes may take days to convert. Rather than follow this path, the applicant has determined that the modelling can be improved by eliminating the conversion to a curved surface model substantially, or altogether. As explained in more detail below, this disclosure provides a method that allows faceted models to be used directly, so the "surfacing" step is removed from the critical path, and significant time savings are achieved, among other benefits. This has the advantage, among other advantages, that the designer is able to model changes to all of the parts of a product, regardless of whether the design data is held in facet form, or as a classic geometric representation. The system and method of this disclosure implements a full-function CAX system in which hybrid models, i.e. mixtures of polygonal meshes and curved surfaces, can participate fully in history or feature-based modelling operations. Conventionally, CAD systems have not allowed the use of hybrid bodies, or even the use of purely faceted bodies, in feature-based modelling operations. Users were unable to use all the available features of their modelling systems for the facet data, as facets are not able to be used in most conventional modelling operations. Although some specialised systems exist that allow modelling with faceted bodies, these systems do not support modern construction and editing techniques using features, history, and associativity.

The modified method can be understood by the fact that an offsetting, or shelling, or thickening operation and detailing is applied directly to the faceted model obtained from scanning. The offset is applied to the thin-walled shell 10 which has been generated from the scanned physical object, in order to make inner walls for the scanned outer wall. This offset is applied to the faceted scanned shape 15, without any conversion of the scanned shape to a surface representation. The faceting on the inner surface 16, seen in FIGS. 8 and 9, may be fairly coarse, since its shape is not particularly critical, as long as the inner surface is a roughly constant distance from the outer surface. Further design steps may include part modelling, such as creating some ribs 13 and bosses 17 on the inside of the shell, to strengthen the structure and provide mounting points for various components, as illustrated by FIG. 10. For this, surface representations are used, rather than a mesh. The interior geometry is created using rib and boss features, which require that the geometry kernel supports extrusions, drafts and Booleans. The end result of the process described above is a B-rep with a mixture of facet and classic geometry. Faces 15, 16 are meshes, collections of facets, but faces 17, 14 are analytic cones and cylinders respectively.

A summary of the steps in a method of the present disclosure is illustrated in FIGS. 11*a* to 11*d*. A physical model 10 is created, as shown in FIG. 11*a*, typically clay or wood, but other materials may be used. A scan 15 of the external shape of the physical model is generated as illustrated in FIG. 11*b*. The scanned shape is facet data, represented as a mesh, or collection of points forming polygons, in this example, triangles. An inner surface 16 is formed, also represented as a mesh, as shown in FIG. 11*c*. Thereafter, parts required for the interior are modelled using a classic geometric representation, rather than a facet based one, shown in FIG. 11*d*. The examples shown here being analytic cones 17, or cylinders 14. The user interface is able to carry out modelling operations on the different surface types, whether mesh, or cylinder or cone. The CAD functions may be applied directly to any of the objects, whether analytic, or faceted. Productivity improvements can be achieved by starting downstream work, such as design of mating parts or packaging using faceted versions of the outer surfaces, rather than waiting for the final converted classic geometric representation of the surface to be prepared. This is possible because the offsetting, the addition of the simple interior shapes, and other subsequent geometric operations are all associative, i.e. history-based, so, if the outer mesh is replaced by a new one, the history can simply be replayed to get a new design, without needing any rework to accommodate the change.

The user interface described in this disclosure comprises history-based modelling functions that allow mixtures of faceted and curved-surface models as their inputs. The system and method described herein enable associative conversion from a classic geometric model, or analytic body, to a facet based model, i.e. from curvy to facet. Previously, conversion from an analytic body to a faceted one was not associative. The faceted body did not remember that it had an analytic body as its parent, so changes could not be propagated from parent to child.

The underlying requirements of a user and a programmer of the software are different. There are two separate elements of any software which is used in computer aided design and engineering. The part of the CAX system which is visible to designers and engineers provides a conceptual view of the model, accessible to the designers via a user interface, whereas each system has a geometry kernel that is accessed through a programming interface to allow changes to its operation to be set up by the CAX programmers.

Within the CAX system user interface, it is important for users to be able to distinguish between different types of objects that might be considered as one by the geometry kernel. Thus, mesh faces, polyline edges, faceted sheet bodies, and faceted solid bodies have been defined to allow the user to determine whether a change is being made to data originally created in facet form, rather than data originally generated as analytic or classic geometric representations, for example in a boundary representation model, which the user interface indicates as faces, edges, sheet bodies and solid bodies as before. In this way, unified modelling functions are able to work in the same way on traditional curvy bodies, faceted bodies, and mixed ones.

The newly defined objects in the user interface allow faceted bodies to be used in associative copying operations. The associative nature of the operations means that a change to one part of the design can be propagated throughout the design, whether the objects are analytic ones, or facet based ones, or a mixture. The main advantage being that delays caused in the past by having to wait until the external surface design had been fixed before completing fastening and tooling steps are removed and a change to the external surface can simply be entered by the user and the other parts updated to cope with it.

Many CAD systems are built on top of a geometry "kernel". The kernel provides tools for representing geometric models and doing computations on them. However, the kernel is just a programming toolkit used by CAD system developers; it has no user interface, and usually no concepts like features, history, or associativity.

Interactions between degree 1 b-spline and PLINE can be understood from the fact that the user interface stores standalone wire-frame curves separately, outside a kernel of the system. When a new curve type is introduced in the kernel, a corresponding curve type has to be introduced in the user interface. The new curve is not merely a "wrapper" for a kernel curve, but it is an independently implemented object in the user interface. In this particular case, for a new curve type "PLINE" or "polyline" introduced in the kernel, a corresponding object is implemented in the user interface as a b-spline curve of degree 1.

When a b-spline curve of degree 1 is used as an input to a user interface, for example an NX function, such as Extrude, the user now a choice about what type of object to produce as output. The output can be either a faceted object or a traditional, classic geometric object. Specific functions have also been modified so that the user can choose what type of output is wanted. This applies particularly to the Extrude and Revolve functions in NX, and in several other functions that produce bodies from curves.

In the past, import of stereolithography (STL) files has been problematic because when the STL files were imported into the user interface, the faceted body was not able to participate in associative copying operations, as explained above. Incorporating the present method allows a full-function CAX system with history-based modelling capabilities to use faceted models directly. As set forth in PCT patent application no. [to be updated] entitled data processing system and method, our reference no. 2015P14906 WO, filed on the same day as this patent document and hereby incorporated by reference to the extent permitted by law, the CAX system is able to treat meshes as surfaces and PLINE as curves. The CAX system is based on topology with minimal emphasis on individual geometry. The system also modifies its functionality to accept faceted topology.

The history based modeller is able to re-generate the final model depending on the user input, modelling the facets with the help of analytic geometry and modelling the analytic geometry with the help of facets.

Figure 12:
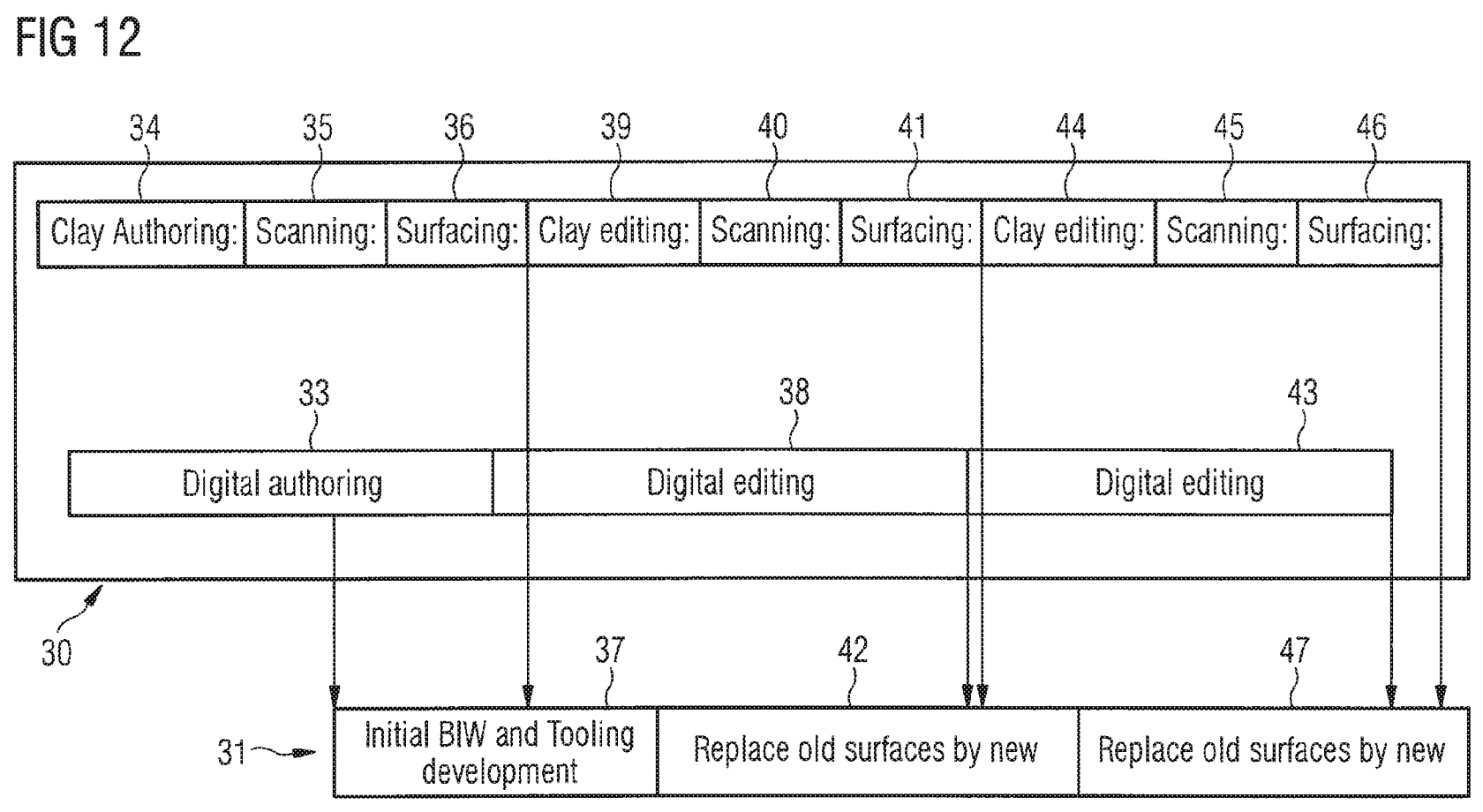
Figure 13:
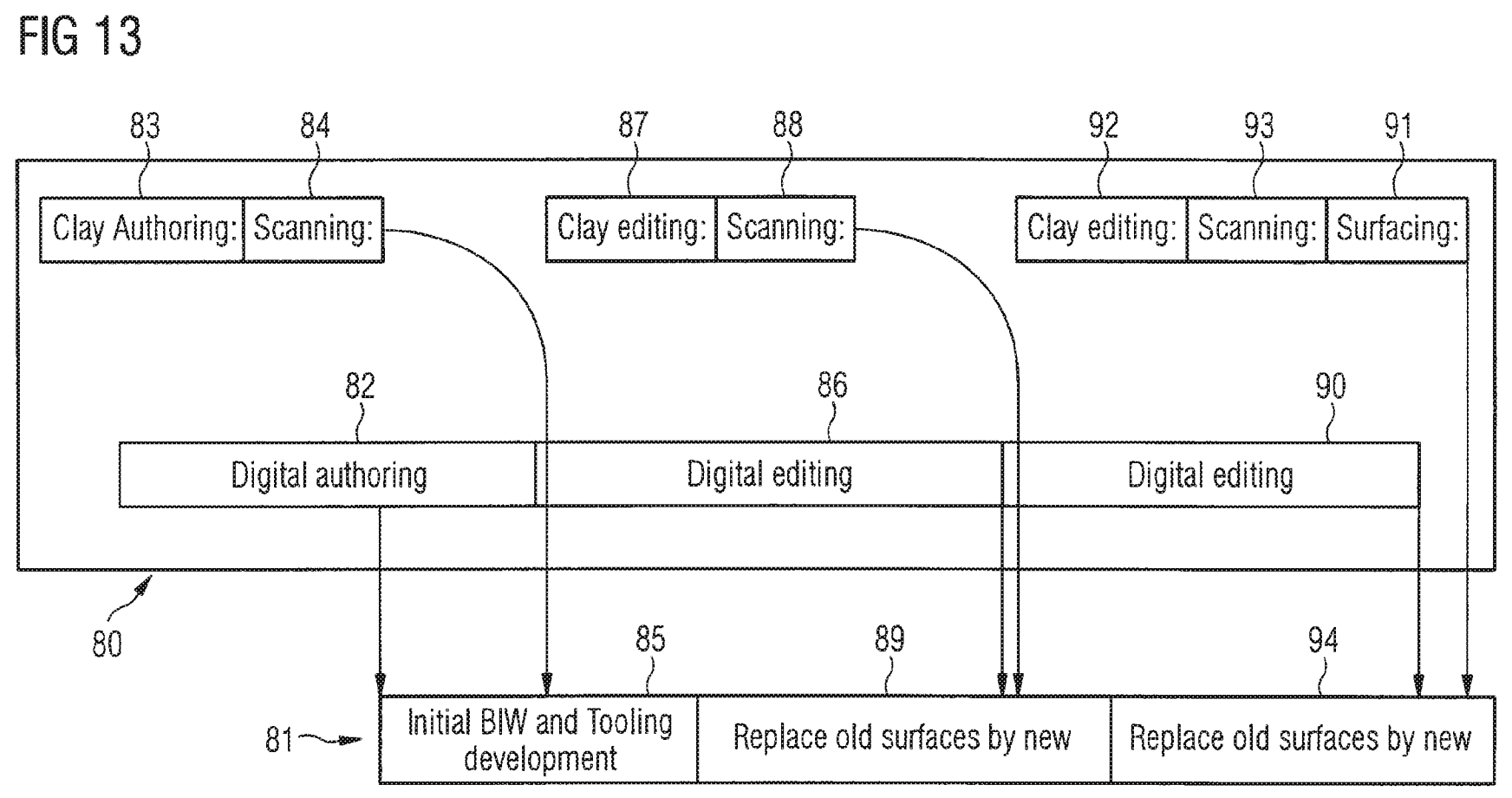

An example of a method of a conventional body in white (BIW) development is illustrated in FIG. 12 and compared with the same process using the method and system of the present disclosure in FIG. 13. Styling of the product and BIW and tooling development are separate, but related workflows 30, 31. In the styling workflow 30, a first stage of digital authoring 33 involves producing a physical model 34, scanning the model 35 and carrying out a surfacing step 36 to build an analytic geometry model from the facet scan data. From this an initial BIW and tooling development stage 37 is begun. Revision of the physical model 39 in a digital editing phase 38 of the styling workflow, requires another scanning step 40 and another surfacing step 41. At the end of the digital editing phase 38, all old surfaces in the BIW and tooling development must be replaced 42 by the new surfaces. A further digital editing stage 43 in the styling workflow 30, involving, as before, physical editing 44, another scanning step 45 and another surfacing step 46, results in the already once replaced old surfaces in the BIW and tooling development being replaced again 47.

By contrast, the method and system of the present disclosure are set out in FIG. 13. Here, the styling workflow 80 begins in a similar way by creating a physical model 83 and scanning 84 that model to produce facet scan data in the digital authoring phase 82. However, there is no need to wait for a surface conversion/creation step, but the facet scan data is made available directly to the BIW and tooling development workflow 81 for the initial development phase 85, so development of BIW parts and tooling can begin early on in the process, using faceted versions of the surfaces that will always be visible to the customer in the end product. In parallel, as this development phase 85 begins further digital editing 86 is carried out in the styling workflow 80, with physical editing 87 and scanning 88. As soon as the scanned data available, it can be provided to the BIW and tooling development workflow 81 and using the history based modelling feature, changes to the scan data may be propagated through and update the BIW and tooling development 85. The surfaces are replaced 89 by the new surfaces, but in their facet form, without a surfacing step. Only necessary changes to the analytic geometry that has been developed so far need to be made by the model propagating these changes. The final digital editing 90 may include a surfacing step 91, in addition to physical modelling 92 and scanning 93, or the scanned facet data may be used directly in generating manufacturing instructions for the outer surface of the product, having again replaced the old surfaces with new ones 94. Either way, a considerable amount of time and processing effort is saved and the surfacing step, if required at all, is removed from the critical path.

By providing a CAD system in which both facet based data and analytic data can be handled and revised, the usefulness to the user is improved. The ability to modify the analytic model with faceted details increases the utility of the CAD system. For the example of the automotive industry, the customer can start building the model with the help of the initial scan and start adding details. When the analytic replacement is available, the designer can replace the faceted model with the analytic model and still retain the end product by replaying the history. Selection and modelling of faceted entities (meshes and plines) is enabled in the same way as any other surface and curve type. The principle of associative relationships and propagation of change as set out herein is particularly useful in modelling with a mixture of mesh data and classic geometry data, as well as more generally.

The advantages include significant time savings, as the full range of modelling techniques may be applied early on in customer workflows; increased ability to use standard CAX systems in mesh based workflows, such as medical implant, or topology optimization; and the ability to work with real world scanned models without the need to convert the scanned data to a conventional (analytic) model.

Although the examples have been described with respect to scanned facet data, it is also possible to create faceted objects manually in the system. In many cases, a faceted object can be created just by calling a specific application programming interface (API) function in the kernel. In other cases, the user interface wants an object that is different from the one returned by the kernel. In these cases, the faceted object must be constructed "manually". In some cases, an analytic object may be constructed and used to generate facets. In other cases, the faceted object must be constructed from first principles, by creating individual facets and piecing these together.

For the specific example of NX, certain operations which previously could only use analytic data are able to use facet based data too. These include wave linking, wave replacement, import from STL, extraction, Boolean, facet cleanup, thicken, shell, extend sheet, offsetting, trimming, splitting topologies, extrusion, imprinting, curve imprinting, curve intersection, curve offsetting, transformations, mirroring, patterning, scale, fit analytic surface, snip, fill hole, decimate, subdivide, smooth, global shaping, merge, draft, deviation, curvature, paint facet body, primitive detection, facet cleanup, shell, measurements, assembly component selection, component replacement, assembly promotion, clearance analysis, component pattern, collision detection (assembly sequencing and move component), assembly cut.

The present disclosure has a number of improvements over conventional methods of dealing with different requirements in product design.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 21 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A geometric modelling method performed by a data processing system on a geometric model comprising a kernel and associated applications, the method comprising:

receiving data for an object including mesh data for mesh regions of the object and classical geometry data for classical geometry regions of the object to be processed by the kernel including inputting the data in history-based modelling functions of a user interface application;

establishing a relationship between the mesh regions of the object and the classical geometry regions of the object;

propagating, based on the established relationship, changes in the data for one of the mesh regions or one of the classical geometry regions to the other of the one of the mesh regions or the one of the classical geometry regions, regardless of a data format of the data, wherein the propagating comprises applying an offsetting, shelling, or thickening operation to the mesh data without conversion of the mesh data to the classical geometry data;

generating a standalone object for the user interface application of the geometric model; and storing, with the user interface application, the standalone object separately and outside the kernel, wherein the standalone object is an independently implemented object in the user interface application relative to the object to be processed by the kernel.

2. The method according to claim 1, further comprising:

detecting changes to the object to be processed by the kernel;

propagating the changes to the object to the stored standalone object to update the standalone object; and storing the updated standalone object.

3. The method according to claim 1, wherein the object to be processed by the kernel comprises one of a mesh or a polyline.

4. The method according to claim 1, further comprising:

receiving an input in a function of the data processing system via the user interface; and, receiving instructions choosing an output format for the function, wherein the output format comprises one of a faceted output or a classic geometry boundary representation output;

processing the input in the function;

applying the chosen output format to the processed input; and outputting the processed input in the chosen output format.

5. The method according to claim 4, wherein the received instructions choosing the output format for the function comprises choosing the output format among a plurality of output formats.

6. The method according to claim 1, further comprising: importing legacy mesh file data into the data processing system;

creating a faceted mesh file from the imported legacy mesh file data; and storing the faceted mesh file for further processing.

7. The method according to claim 1, wherein the receiving of the data for the object comprises receiving the mesh data for the object comprising a connected collection of facets; and wherein the storing the standalone object comprises storing the mesh data without converting the mesh data into a different data format.

8. The method according to claim 1, wherein the receiving of the data for the object comprises receiving second mesh data for the object comprising a connected collection of facets, and wherein the storing of the standalone object comprises replacing the mesh data with the second mesh data, without converting the second mesh data into a different data format.

9. The method according to claim 1, wherein the user interface application enables an associative conversion between both of faceted and curved-surface models.

10. The method according to claim 1, wherein an inputted faceted model represents an outer surface of the object and an inputted curved-surface model represents associated tooling of the object.

11. The method according to claim 1, further comprising: directly using a faceted model obtained in the inputting of the data such that a surfacing step of converting the faceted model to a curved-surface model is avoided.

12. The method according to claim 1, further comprising: receiving the changes in the data for one of the mesh regions or the classical geometry regions; and propagating the changes in the data to another of the mesh regions or the classical geometry regions, regardless of the data format.

13. The method according to claim 1, wherein the establishing comprises establishing the relationship between an inner surface of the mesh regions of the object and an outer surface of the classical geometry regions of the object, wherein the mesh regions represent an outer surface of the object and the classic geometry regions represent interior surfaces of the object, wherein the classic geometry regions do not represent the outer surface of the object and the mesh regions do not represent the interior surfaces of the object, and wherein the offsetting, the shelling, or the thickening operation comprises forming the inner surface of the mesh regions such that the inner surface is spaced apart from the outer surface.

14. The method according to claim 13, further comprising:

scanning a physical object to generate the mesh data representing the mesh region of the object; and modelling the interior surfaces of the object including ribs and bosses of the object with the classical geometry data including analytic cones or cylinders, wherein the propagating comprises applying the offsetting operation including forming the inner surface of the mesh regions by applying an offset to the outer surface of the object such that the inner surface is spaced apart from the outer surface.

* * * * *